United States Patent [19]

Wada et al.

[11] 4,269,747

[45] May 26, 1981

[54] CROSSLINKABLE ADHESIVE COMPOSITION

[75] Inventors: Akira Wada, Yokohama, Japan; Bernard J. Davis, Pass Christian, Miss.

[73] Assignee: Nippon Zeon Co., Ltd., Tokyo, Japan

[21] Appl. No.: 142,765

[22] Filed: Apr. 22, 1980

[30] Foreign Application Priority Data

Apr. 23, 1979 [JP] Japan .................................. 54-50152

[51] Int. Cl.³ ............................................. C08L 53/02
[52] U.S. Cl. ............................. 260/27 BB; 260/27 R; 260/33.64 UA; 525/92; 525/96
[58] Field of Search ................ 525/96, 92; 260/27 R, 260/27 BB

[56] References Cited

U.S. PATENT DOCUMENTS

| | | | |
|---|---|---|---|
| 3,239,478 | 3/1966 | Harlan | 260/27 |
| 3,736,281 | 5/1973 | Russell | 260/27 R |
| 3,743,616 | 7/1973 | Kest | 260/27 BB |
| 3,753,936 | 8/1973 | Marrs | 260/27 R |
| 4,028,292 | 6/1977 | Korpman | 525/92 |

FOREIGN PATENT DOCUMENTS 1277363  6/1972  United Kingdom .

*Primary Examiner*—Carman J. Seccuro
*Attorney, Agent, or Firm*—Sherman & Shalloway

[57] ABSTRACT

A crosslinkable adhesive composition comprising (a) a thermoplastic elastomer of the general formula $(A-B)_n$ or $(A-B)_{n-1}-A$ wherein A represents a block of a monovinyl aromatic hydrocarbon polymer, B represents a block of a conjugated diolefin polymer, and n represents an integer of from 2 to 10, (b) a tackifying resin and (c) a cross-linkable tackifying resin, said tackifying resin (c) being an ester formed between a hydroxyl-containing tackifying resin and acrylic or methacrylic acid. Preferably, the composition comprises 100 parts by weight of the component (a), 40 to 200 parts by weight of the component (b), and 5 to 55 parts by weight of the component (c).

4 Claims, No Drawings

CROSSLINKABLE ADHESIVE COMPOSITION

This invention relates to a novel crosslinkable adhesive composition. More specifically, this invention relates to a crosslinkable adhesive composition, preferably a pressure-sensitive adhesive composition, having excellent adhesive properties, thermal stability and solvent resistance.

It has been well known that a thermoplastic elastomeric block polymer derived from a monovinyl aromatic hydrocarbon and a conjugated diolefin can be used as a base polymer for pressure-sensitive adhesives or hot-melt adhesives. For example, if a tackifying resin such as rosin-type resins and terpene resins and a process oil are mixed with a block polymer of the A—B—A type, there can be obtained an adhesive composition useful as pressure-sensitive adhesives, hot-melt adhesives and latex adhesives (U.S. Pat. No. 3,239,478). Mixing of an aliphatic hydrocarbon resin with a block polymer of the A—B—A type gives an adhesive composition useful as a pressure-sensitive adhesive (British Pat. No. 1,277,363). Likewise, a composition useful as various adhesives can be obtained by mixing a block polymer of the A—B—A—B type or a block polymer of the A—B—A—B—A type with a tackifying resin (Japanese Patent Publication No. 330/74).

Such a thermoplastic elastomer as a base polymer is superior to a non-thermoplastic elastomer such as natural rubber as a base polymer in regard to cohesive force, but suffers from the defect of inferior thermal stability and solvent resistance. In an attempt to remedy this defect, methods have been investigated in which the base polymer is mixed with a reactive crosslinking agent such as trimethylolpropane triacrylate, pentaerythritol tetraacrylate, ethylene glycol diacrylate and diallyl phthalate, and crosslinked by heat, ultraviolet irradiation, electron beam irradiation, etc. Although the methods involving the use of these known crosslinking agents can remedy the aforesaid defect, the resulting compositions have the new defect that their adhesive properties, which are basic properties of adhesives, are drastically degraded.

It is an object of this invention therefore to provide an adhesive composition having superior thermal stability and solvent resistance and a balanced combination of excellent tackiness strength, adhesion strength and cohesive force.

The present inventors have found as a result of extensive investigations that the aforesaid object of this invention can be achieved by using a specified crosslinkable tackitying resin.

Thus, according to this invention, there is provided a crosslinkable adhesive composition comprising (a) a thermoplastic elastomer of the general formula $(A—B)_n$ or $(A—B)_{n-1}A$ wherein A represents a block of a monovinyl aromatic hydrocarbon polymer, B represents a block of a conjugated diolefin polymer, and n is an integer of from 2 to 10, (b) a tackifying resin and (c) a crosslinkable tackifying resin which is an ester of a hydroxyl-containing tackifying resin and acrylic or methacrylic acid, and optionally other conventional additives such as crosslinking accelerators, softening agents and volatile solvents.

The thermoplastic elastomer (a) as a first essential ingredient of the composition of this invention is a block copolymer derived essentially from a monovinyl aromatic hydrocarbon such as styrene or alpha-methylstyrene and a conjugated diolefin such as 1,3-butadiene and isoprene, and is expressed by the above-given general formula. The content of the block A in this block polymer is usually 5 to 50% by weight, preferably 10 to 35% by weight. The polymer has a number average molecular weight of usually 25,000 to 500,000, preferably 40,000 to 200,000. Such a block polymer also encompasses a so-called "tapered block polymer" which contains as a substantial polydiolefin block a copolymer containing a small amount of a monovinyl aromatic hydrocarbon unit in a progressively increasing proportion from one end of the block to the other, and a hydrogenated block polymer in which the double bonds of the polydiolefin block are partly or wholly hydrogenated. These block polymers are known substances, and can be produced by known methods involving the use of lithium-type initiators, for example the methods disclosed in U.S. Pat. No. 3,251,905, U.S. Pat. No. 3,265,765, British Pat. No. 1,130,770, and Japanese Patent Publication No. 2394/68. Any of block polymers corresponding to the above general formula are useful in this invention. Of these, block polymers of the general formula A—B—A or A—B—A—B are preferred. A block polymer of styrene and isoprenene is especially preferred.

The tackifying resin (b) as a second essential ingredient may be any tackifying resin which is compatible with the thermoplastic elastomer (a) and not crosslinkable and which has previously been used in the art. For example, there can be used rosin, rosin derivatives, terpene resins, aliphatic hydrocarbon resins, alicyclic hydrocarbon resins, aromatic hydrocarbon resins, and the hydrogenation products of these. Those having a softening point of 50° to 150° C. are preferred.

The crosslinkable tackifying resin (c) as a third essential ingredient is an ester formed between a hydroxyl-containing tackifying rsin and acrylic or methacrylic acid. Specific examples of the hydroxyl-containing tackifying resin are (i) copolymers of cyclopentadiene monomers such as cyclopentadiene and dicyclopentadiene and unsaturated alcohols such as allyl alcohol, crotyl alcohol, 1,4-butenediol and hydroxyethyl acrylate, (ii) copolymers of aromatic vinyl monomers such as styrene, alpha-methylstyrene and vinyl toluene and the aforesaid unsaturated alcohols, (iii) copolymers of the aforesaid aromatic vinyl monomers and phenols such as phenol and cresol, (iv) phenolic resins obtained by the condensation of phenols such as phenol and cresol with formaldehyde, and (v) coumarone resin or xylene resin modified with phenolic resins. The resins (i), (ii) and (iii) are preferred in view of their adhesive properties, and from the economical viewpoint, the resins (i) and (ii) are especially preferred. Preferably, these hydroxyl-containing takifying resins have a hydroxyl value of 100 to 350, particularly 130 to 300, and a softening point of 30° to 160° C. An ester obtained by reacting a hydroxyl-containing tackifying resin having a low hydroxyl value with acrylic or methacrylic acid tends to exhibit reduced compatibility with thermoplastic elastomers.

The crosslinkable tackifying resin (c) is usually obtained by an esterification reaction between the hydroxyl-containing tackifying resin and acrylic or methacrylic acid, for example by heating them at 80° to 150° C. in the presence or absence of an acid catalyst. This method is not limitative, and any method which will afford such an ester can be used in this invention. Crosslinkable tackifying resins (c) having a softening point of usually 20° to 150° C., preferably 30° to 110° C., in which at least 50%, especially at least 70%, of the hydroxyl groups are esterified show especially good improved effects.

In the present invention, the three essential ingredients are used in optional proportions. Usually, the mixing proportions are such that 40 to 200 parts by weight of the tackifying resin (b) and 5 to 55 parts by weight of the crosslinkable tackifying resin (c) are used per 100 parts by weight of the thermoplastic elastomer (a). Preferably, 50 to 150 parts by weight of the component (b) and 10 to 50 parts by weight of the component (c) are used per 100 parts by weight of the component (a).

Preferably, a crosslinking accelerator is incorporated in the composition of this invention in order to accelerate the crosslinking reaction of the crosslinkable tackifying resin (c). For example, when the crosslinking reaction is to be performed by heating, a radical initiator such as benzoyl peroxide and dicumyl peroxide is selected and used in an effective amount. When the crosslinking reaction is to be carried out by ultraviolet irradiation, electron beam irradiation, etc., a sensitizer, such as benzoin ether, benzophenone, acetophenone, and derivatives of these, is used in an effective amount.

If desired, there can be incorporated into the composition of this invention plasticizers such as phthalic acid esters and adipic acid esters; softening agents, for example liquid resins such as polybutene oil, polybutadiene oil, polypentadiene oil, liquid hydrocarbon resins, liquid terpene resins and liquid rosin, and extending oils such as naphthenic process oils, aromatic process oils and paraffinic process oils; volatile solvents; waxes; and antioxidants. Other elastomers and other crosslinkable compounds may be used in combination with the composition of this invention in amounts which do not substantially reduce the advantages of this invention.

The adhesive composition of this invention can be easily obtained by blending the aforesaid ingredients in accordance with a customary method. For exaple, a solvent-base composition may be obtained by mixing the individual ingredients in a solvent, and a solventless composition may be obtained by mixing the individual ingredients at an elevated temperature of 100° to 250° C.

The resulting adhesive composition of this invention is very useful as a solvent-based or hot melt-type pressure-sensitive adhesive and also finds application as a hot melt-type adhesive. By coating the adhesive composition on a substrate or adherent and then subjected to heat treatment or to irradiation of ultraviolet light, electron beams, etc., excellent adhesive properties including thermal stability and solvent resistance can be obtained.

The following Example and Referential Examples illustrate the present invention more specifically. In these examples, all parts are by weight.

REFERENTIAL EXAMPLE 1

An autoclave was charged with 120 parts of allyl alcohol, 360 parts of dicyclopentadiene and 120 parts of xylene, and they were heat polymerized at 260° C. for 3 hours. The resulting product was distilled to afford 338 parts of a hydroxyl-containing resin (I) having a hydroxyl value of 185, a softening point of 102° C. and a Gardner color number of 5.

REFERENTIAL EXAMPLE 2

Allyl alcohol (168 parts), 312 parts of dicyclopentadiene and 120 parts of xylene were reacted in the same way as in Referential Example 1 to afford 304 parts of a hydroxyl-containing resin (II) having a hydroxyl value of 254, a softening point of 79° C. and a Gardner color number of 7.

REFERENTIAL EXAMPLE 3

Allyl alcohol (180 parts), 320 parts of styrene and 15 parts of di-tertiary butyl peroxide were charged into an autoclave, and reacted at 210° C. for 30 minutes. The reaction product was distilled to afford 320 parts of a hydroxyl-containing resin (III) having a hydroxl value of 170, a softening point of 117° C. and a Gardner color number of 1.

REFERENTIAL EXAMPLE 4

250 Parts of each of the hydroxyl-containing resins (I), (II) and (III) obtained in Referential Examples 1 to 3 and acrylic acid were reacted in a stream of nitrogen at 100° to 120° C. for 8 hours in accordance with the recipes shown in Table 1 to obtain crosslinkable resins A, B and C having the properties shown in Table 1.

TABLE 1

| Crosslinkable resin | A | B | C |
|---|---|---|---|
| Hydroxyl-containing resin | I | II | III |
| Proportions (parts) | | | |
| Acrylic acid | 70 | 100 | 65 |
| Hydroquinone | 0.32 | 0.35 | 0.315 |
| p-Toluenesulfonic acid | 3.20 | 3.5 | 3.15 |
| Benzene | 50 | 50 | 50 |
| Softening point (°C.) | 79 | 96 | 42 |
| Color number | 14 | 13 | 14 |

EXAMPLE 1

One hundred parts of a block polymer of the styrene-isoprene-styrene type (Kraton 1107, a trademark for a product of Shell Chemical Co.), and predetermined amount of an aliphatic hydrocarbon resin (Quintone U-185, a trademark for a product of Nippon Zeon Co., Ltd.; softening point 85° C.), a predetermined amount of a crosslinkable tackifying resin, 20 parts of a plasticizer (Shellflex 371 N, a trademark for a product of Shell Chemical Co.), 2 parts of an antioxidant (Irganox 1010, a trademark for a product of Ciba-Geigy) and 4 parts of benzophenone were mixed in 330 parts of toluene to prepare a pressure-sensitive adhesive.

The pressure-sensitive adhesive was coated on a 25 micron-thick polyester film by an applicator to prepare a pressure-sensitive tape having an adhesive layer thickness of 25 microns. The pressure-sensitive tape was passed under a 500 W mercury lamp at a speed of 50 cm/min. to irradiate ultraviolet light, and the adhesive properties of the tape were measured by conventional methods as follows:

The tackiness strength was measured in accordance with the J. Dow method [Proc. Inst. Rub. Ind., 1, 105 (1954)]. Specifically, an adhesive tape specimen, 10 cm long, was bonded to the slope of a stainless steel plate inclined at 30° so that the lower end of the tape was contiguous to the flat surface below. Stainless steel balls having 32 different diameters ranging from 1/32 inch to 1 inch were each allowed to roll at an initial speed of 0 at the upper end of the bonded adhesive tape. The tackiness strength of the tape is defined as the diameter of a ball which had the largest diameter among those balls which stopped on the adhesive tape bonded to the slope.

The adhesion strength was measured in accordance with JIS Z-1522. Specifically, an adhesive tape specimen, 25 mm in width and 100 mm in length, was bonded to a stainless steel plate polished with a #280 waterproof polishing paper, and then peeled at an angle of 180° at 25° C. at a speed of 200 mm/min.

The cohesive strength was measured in accordance with JIS Z-1524. Specifically, an adhesive tape specimen was bonded to a stainless steel plate polished with a #280 waterproof polishing paper so that its area of 25 mm × 10 mm contacted the stainless steel plate. A load of 1 kg was exerted on the tape at 70° C., and the time which elapsed until the adhesive tape was removed was measured.

The heat stabilization temperature was measured as follows: A pressure-sensitive tape specimen was bonded to a surface having a temperature gradient of from 50° C. to 200° C., and after a lapse of 30 seconds, was peeled off. The heat stabilization temperature is defined as the maximum temperature at which interfacial destruction occurs at the time of the aforesaid peeling.

The solvent resistance was evaluated by dipping an adhesive tape specimen in toluene at room temperature for 1 minute, withdrawing it therefrom, and examining it for the presence of tackiness. (When the tape has inferior solvent resistance, the adhesive dissolves and the tape does not show tackiness.) The results are shown in Table 2.

tackiness strength and adhesion strength; but that when a hydroxyl-containing resin is used (Run No. 7), the adhesive properties of the resulting composition were markedly impaired, and when trimethylolpropane triacrylate, a conventional crosslinking agent, is used (Run No. 8), the adhesive composition obtained shows an improvement in heat stability and solvent resistance but its adhesive properties are drastically deteriorated.

What we claim is:

1. A crosslinkable adhesive composition comprising
   (a) a thermoplastic elastomer of the general formula (A—B)$_n$ or (A—B)$_{n-1}$—A wherein A represents a block of a monovinyl aromatic hydrocarbon polymer, B represents a block of a conjugated diolefin polymer, and n represents an integer of from 2 to 10,
   (b) a non-crosslinkable tackifying resin, and
   (c) a crosslinkable tackifying resin, said crosslinkable tackifying resin (c) being an ester of a hydroxyl-containing tackifying resin with acrylic or methacrylic acid.

2. The composition of claim 1 which comprises 100 parts by weight of the component (a), 40 to 200 parts by weight of the component (b) and 5 to 55 parts by weight of the component (c).

3. The composition of claim 1 wherein the component (c) has a softening point of 20° to 150° C.

4. The composition of claim 3 wherein said hydroxyl-containing tackifying resin has a hydroxyl value of 100 to 350° C.

TABLE 2

| Run No. | 1 | 2 | 3 | 4 | 5 | 6 | 7 | 8 |
|---|---|---|---|---|---|---|---|---|
| | Invention | | | | | | Control | |
| Crosslinkable resin | A | B | B | B | C | — | (*1) | (*2) |
| Amount (parts) of the crosslinkable resin | 25 | 10 | 25 | 50 | 25 | — | 25 | 25 |
| Amount (parts) of the tackifying resin | 75 | 90 | 75 | 50 | 75 | 100 | 75 | 75 |
| Adhesive characteristics | | | | | | | | |
| Tackiness strength (1/32 inch) | 21 | 26 | 25 | 21 | 20 | 26 | below 3 | below 3 |
| Adhesion strength (g/25 mm) | 870 | 810 | 855 | 810 | 850 | 930 | 505 | 480 |
| Cohesive strength (minutes) | above 120 | 75 | 90 | above 120 | above 120 | 30 | below 5 | below 5 |
| Heat stabilization temperature (° C.) | 125 | 135 | 150 | above 200 | 120 | 105 | 95 | above 200 |
| Solvent resistance | Yes | Yes | Yes | Yes | Yes | No | No | No |

(*1):The hydroxyl-containing resin (II) obtained in Referential Example 2 was blended.
(*2):Trimethylolpropane triacrylate was blended.

The results shown in Table 2 demonstrate that the adhesive compositions of this invention exhibit a great improvement in heat stability, solvent resistance and cohesive strength without a significant reduction in

* * * * *